US009734616B1

(12) United States Patent
Comet et al.

(10) Patent No.: US 9,734,616 B1
(45) Date of Patent: Aug. 15, 2017

(54) TETRAHEDRAL VOLUMES FROM SEGMENTED BOUNDING BOXES OF A SUBDIVISION

(71) Applicant: Pixar, Emeryville, CA (US)

(72) Inventors: Michael Comet, San Ramon, CA (US); Venkateswaran Krishna, Albany, CA (US); Dirk Van Gelder, Piedmont, CA (US)

(73) Assignee: PIXAR, Emeryville, CA (US)

(*) Notice: Subject to any disclaimer, the term of this patent is extended or adjusted under 35 U.S.C. 154(b) by 308 days.

(21) Appl. No.: 14/052,383

(22) Filed: Oct. 11, 2013

(51) Int. Cl.
   *G06T 13/40* (2011.01)
   *G06T 13/20* (2011.01)
(52) U.S. Cl.
   CPC .................... *G06T 13/40* (2013.01)
(58) Field of Classification Search
   CPC ................... G06T 13/40; G06T 13/20
   USPC ........................................... 345/420
   See application file for complete search history.

(56) References Cited

U.S. PATENT DOCUMENTS

| 8,054,311 B1* | 11/2011 | Sheffler | G06T 13/40 345/419 |
| 2004/0109603 A1* | 6/2004 | Bitter | G06T 7/0083 382/154 |
| 2004/0227761 A1* | 11/2004 | Anderson | G06T 13/40 345/473 |
| 2011/0148874 A1* | 6/2011 | Cha | G06T 13/40 345/420 |

* cited by examiner

*Primary Examiner* — Barry Drennan
*Assistant Examiner* — Shivang Patel
(74) *Attorney, Agent, or Firm* — Kilpatrick Townsend & Stockton LLP

(57) ABSTRACT

In various embodiments, systems and methods are disclosed for rapidly generating tetrahedral volumes using centerlines in character animation. The volumes are generated to closely approximate bounding volumes that provide rapid collision detection while at the same time conforming to the original mesh surface. Therefore, more accurate and higher quality collisions are achieved using the original surface in real-time and without using a proxy/simulation.

21 Claims, 12 Drawing Sheets

TETRAHEDRAL VOLUMES FROM SEGMENTED BOUNDING BOXES OF A SUBDIVISION

BACKGROUND

The present disclosure generally relates to computer animation, and more specifically to dynamically creating tetrahedral meshes using centerlines on animated characters.

With the widespread availability of computers, computer graphics artists and animators can rely upon computers to assist in production process for creating animations and computer-generated imagery (CGI). This may include using computers to have physical models be represented by virtual models in computer memory. Typically, two-dimensional (2D) or three-dimensional (3D) computer-aided animation combines 2D/3D models of objects and programmed movement of one or more of the models. In 3D computer animation, the first step is typically the object modeling process. Objects can be sculpted much like real clay or plaster, working from general forms to specific details, for example, with various sculpting tools. Models may then be constructed, for example, out of geometrical vertices, faces, and edges in a 3D coordinate system to represent the objects. These virtual models can then be manipulated using computers to, for example, simulate physics, design aesthetic actions such as poses or other deformations, create lighting, coloring and paint, or the like, of characters or other elements of a computer animation display.

Meshes of triangles or tetrahedra have many applications, including interpolation, rendering, and numerical methods such as the finite element method, fluid simulations, medical simulations, and the like. Most such applications demand more than just a triangulation of an object or domain, such as a polygonal mesh. To ensure accurate results, the triangles or tetrahedra must be "well shaped" and thus satisfy various criteria and/or constraints, such as having small aspect ratios, conformity to original mesh boundaries, minimum tetrahedral (tet) size, bounds on their smallest and largest angles, and the like.

Many different methods for generating tetrahedral volumes from an object or domain exist. These methods include Delaunay triangulation, red-green refinement, advancing front methods, FCC/BCC lattice refinement, and the like. Many of these methods are designed to generate tetrahedral (tet) volumes appropriate for a particular purpose (e.g., finite element simulation) and therefore create volumes satisfying the criteria and/or constraints.

The choice of the method of construction for a given application can be determined by a variety of factors. These factors may include the computational costs of computing a tet volume for an object or domain, the suitability of the tet volume to the application, the cost of updating it in applications in which the objects can move or change shape or size, the cost of determining intersections, and any desired precision tests. Sophisticated volumes generally allow for less void space but are more computationally expensive and therefore are unsuited for some applications. Less structured volumes are less computationally expensive but again can be unsuited to some application.

Therefore, it is desirable to provide new systems and methods for rapidly generating tetrahedral volumes in character animation.

BRIEF SUMMARY

The following portion of this disclosure presents a simplified summary of one or more innovations, embodiments, and/or examples found within this disclosure for at least the purpose of providing a basic understanding of the subject matter. This summary does not attempt to provide an extensive overview of any particular embodiment or example. Additionally, this summary is not intended to identify key/critical elements of an embodiment or example or to delineate the scope of the subject matter of this disclosure. Accordingly, one purpose of this summary may be to present some innovations, embodiments, and/or examples found within this disclosure in a simplified form as a prelude to a more detailed description presented later.

In various embodiments, systems and methods are disclosed for rapidly generating tetrahedral volumes using centerlines on animated characters. The tetrahedral volumes can be generated with features similar to an original mesh surface of an animated character in a rapid and efficient manner. The rapid generation of the tetrahedral volumes allows them to be used for a variety of real-time or near real-time purposes, such as approximating bounding volumes for collision detection. Accordingly, in one aspect, more accurate and higher quality collision detection can be achieved using the original mesh surface in real-time without using a proxy of the original mesh surface or a simulation thereof. In another aspect, the tetrahedral volumes can be used in simulations as a more suitable proxy dynamically generated from the original mesh surface.

In one embodiment, a method for dynamically generating tetrahedral meshes on animated characters includes receiving information indicative of how to generate a centerline associated with a first pose of a polygonal mesh of a character. Information is received specifying a deformation of the polygonal mesh of the character into a second pose. A centerline associated with the second pose of the polygonal mesh is then generated based on the information indicative of how to generate the centerline associated with the first pose. A tetrahedral mesh is generated that bounds the second pose of the polygonal mesh of the character using the centerline associated with the second pose.

In one aspect, generating the centerline associated with the second pose of the polygonal mesh includes determining location relative to the second pose of a plurality of bounding boxes associated with first pose based on the information indicative of how to generate the centerline associated with the first pose. A set of control points is determined that define the centerline based on the determined location of the plurality of bounding boxes. Generating the tetrahedral mesh may include determining a correspondence between a first polygon associated with the polygonal mesh and at least one location associated with the centerline of the second pose. One or more tetrahedron of the tetrahedral mesh may be generated based on extending the at least one polygon associated with the polygonal mesh between the at least one location associated with the centerline of the second pose.

In some embodiments, generating the tetrahedral mesh occurs in real-time relative to the deformation of the polygonal mesh of the character. In one embodiment, the tetrahedral mesh is generated using the centerline associated with the first pose of the polygonal mesh based on extending the polygonal mesh to the centerline associated with the first pose. In another aspect, information specifying a reference axis is received and a plurality of bounding boxes is generated along the references axis. Each bounding box bounds at least a portion of the first pose of the polygonal mesh. The centerline associated with the first pose of the polygonal mesh may be generated based on each of the plurality of bounding boxes. The information indicative of how to generate the centerline associated with the first pose of the polygonal mesh may cached in memory to facilitate subsequent processing and operations.

In various embodiments, information may be generated resolving any collisions based on the tetrahedral mesh. Animation information may be generated based on the tetrahedral mesh and the information specifying the deformation of the polygonal mesh of the character into the second pose.

In one embodiment, a non-transitory computer-readable medium storing computer-executable code for dynamically generating tetrahedral meshes on animated characters includes code for receiving information indicative of how to generate a centerline associated with a first pose of a polygonal mesh of a character, code for receiving information specifying a deformation of the polygonal mesh of the character into a second pose, code for generating a centerline associated with the second pose of the polygonal mesh based on the information indicative of how to generate the centerline associated with the first pose, and code for generating a tetrahedral mesh that bounds the second pose of the polygonal mesh of the character using the centerline associated with the second pose.

In a further embodiment, method for resolving real-time collisions of animated characters includes receiving information specifying associations between one or more locations on a first pose of a character and a plurality of bounding boxes associated with a first polygonal mesh forming the first pose. Information is received specifying a second pose of the character. A centerline is determined for the second pose of the character based on the location of each of the plurality of bounding boxes relative to a second polygonal mesh representing the second pose of the character according to the associations between the one or more locations on the first pose of the character and the plurality of bounding boxes. Information is then generated resolving any collisions based on a bounding volume dynamically created for the second polygonal mesh forming the second pose using the centerline for the second pose.

A further understanding of the nature of and equivalents to the subject matter of this disclosure (as well as any inherent or express advantages and improvements provided) should be realized in addition to the above section by reference to the remaining portions of this disclosure, any accompanying drawings, and the claims.

BRIEF DESCRIPTION OF THE DRAWINGS

In order to reasonably describe and illustrate those innovations, embodiments, and/or examples found within this disclosure, reference may be made to one or more accompanying drawings. The additional details or examples used to describe the one or more accompanying drawings should not be considered as limitations to the scope of any of the claimed inventions, any of the presently described embodiments and/or examples, or the presently understood best mode of any innovations presented within this disclosure.

DETAILED DESCRIPTION

In various embodiments, systems and methods are disclosed for rapidly generating tetrahedral volumes using centerlines on animated characters. The tetrahedral volumes can be generated with features similar to an original mesh surface of an animated character in a rapid and efficient manner. The rapid generation of the tetrahedral volumes allows them to be used for a variety of real-time or near real-time purposes, such as approximating bounding volumes for collision detection. Accordingly, in one aspect, more accurate and higher quality collision detection can be achieved using the original mesh surface in real-time without using a proxy of the original mesh surface or a simulation thereof. In another aspect, the tetrahedral volumes can be used in simulations as a more suitable proxy dynamically generated from the original mesh surface.

Figure 1:
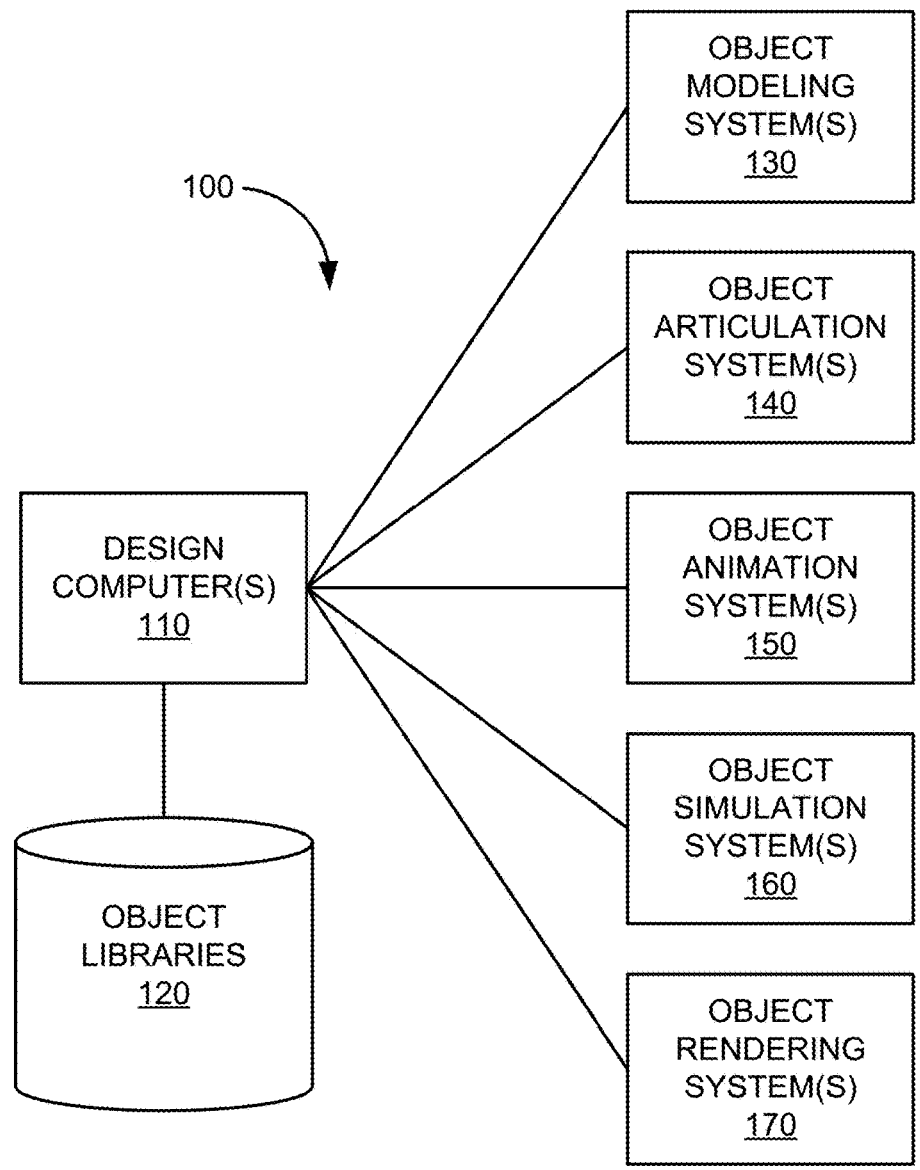
FIG. 1 is a simplified block diagram of a system for creating computer graphics imagery (CGI) and computer-aided animation that may implement or incorporate various embodiments or techniques for dynamically generating tetrahedral meshes using a centerline on animated characters.

FIG. 1 is a simplified block diagram of system 100 for creating computer graphics imagery (CGI) and computer-aided animation that may implement or incorporate various embodiments or techniques for dynamically generating tetrahedral meshes using a centerline on animated characters. In this example, system 100 can include one or more design computers 110, object library 120, one or more object modeler systems 130, one or more object articulation systems 140, one or more object animation systems 150, one or more object simulation systems 160, and one or more object rendering systems 170.

The one or more design computers 110 can include hardware and software elements configured for designing CGI and assisting with computer-aided animation. Each of the one or more design computers 110 may be embodied as a single computing device or a set of one or more computing devices. Some examples of computing devices are PCs, laptops, workstations, mainframes, cluster computing system, grid computing systems, cloud computing systems, embedded devices, computer graphics devices, gaming devices and consoles, consumer electronic devices having programmable processors, or the like. The one or more design computers 110 may be used at various stages of a production process (e.g., pre-production, designing, creating, editing, simulating, animating, rendering, post-production, etc.) to produce images, image sequences, motion pictures, video, audio, or associated effects related to CGI and animation.

In one example, a user of the one or more design computers 110 acting as a modeler may employ one or more systems or tools to design, create, or modify objects within a computer-generated scene. The modeler may use modeling software to sculpt and refine a neutral 3D model to fit predefined aesthetic needs of one or more character designers. The modeler may design and maintain a modeling topology conducive to a storyboarded range of deformations. In another example, a user of the one or more design computers 110 acting as an articulator may employ one or more systems or tools to design, create, or modify controls or animation variables (avars) of models. In general, rigging is a process of giving an object, such as a character model, controls for movement, therein "articulating" its ranges of motion. The articulator may work closely with one or more animators in rig building to provide and refine an articulation of the full range of expressions and body movement needed to support a character's acting range in an animation. In a further example, a user of design computer 110 acting as an animator may employ one or more systems or tools to specify motion and position of one or more objects over time to produce an animation.

Object library 120 can include hardware and/or software elements configured for storing and accessing information related to objects used by the one or more design computers 110 during the various stages of a production process to produce CGI and animation. Some examples of object library 120 can include a file, a database, or other storage devices and mechanisms. Object library 120 may be locally accessible to the one or more design computers 110 or hosted by one or more external computer systems.

Some examples of information stored in object library 120 can include an object itself, metadata, object geometry, object topology, rigging, control data, animation data, animation cues, simulation data, texture data, lighting data, shader code, or the like. An object stored in object library 120 can include any entity that has an n-dimensional (e.g., 2D or 3D) surface geometry. The shape of the object can include a set of points or locations in space (e.g., object space) that make up the object's surface. Topology of an object can include the connectivity of the surface of the object (e.g., the genus or number of holes in an object) or the vertex/edge/face connectivity of an object.

The one or more object modeling systems 130 can include hardware and/or software elements configured for modeling one or more computer-generated objects. Modeling can include the creating, sculpting, and editing of an object. The one or more object modeling systems 130 may be invoked by or used directly by a user of the one or more design computers 110 and/or automatically invoked by or used by one or more processes associated with the one or more design computers 110. Some examples of software programs embodied as the one or more object modeling systems 130 can include commercially available high-end 3D computer graphics and 3D modeling software packages 3D STUDIO MAX and AUTODESK MAYA produced by Autodesk, Inc. of San Rafael, Calif.

In various embodiments, the one or more object modeling systems 130 may be configured to generated a model to include a description of the shape of an object. The one or more object modeling systems 130 can be configured to facilitate the creation and/or editing of features, such as non-uniform rational B-splines or NURBS, polygons and subdivision surfaces (or SubDivs), that may be used to describe the shape of an object. In general, polygons are a widely used model medium due to their relative stability and functionality. Polygons can also act as the bridge between NURBS and SubDivs. NURBS are used mainly for their ready-smooth appearance and generally respond well to deformations. SubDivs are a combination of both NURBS and polygons representing a smooth surface via the specification of a coarser piecewise linear polygon mesh. A single object may have several different models that describe its shape.

The one or more object modeling systems 130 may further generate model data (e.g., 2D and 3D model data) for use by other elements of system 100 or that can be stored in object library 120. The one or more object modeling systems 130 may be configured to allow a user to associate additional information, metadata, color, lighting, rigging, controls, or the like, with all or a portion of the generated model data.

The one or more object articulation systems 140 can include hardware and/or software elements configured to articulating one or more computer-generated objects. Articulation can include the building or creation of rigs, the rigging of an object, and the editing of rigging. The one or more object articulation systems 140 may be invoked by or used directly by a user of the one or more design computers 110 and/or automatically invoked by or used by one or more processes associated with the one or more design computers 110. Some examples of software programs embodied as the one or more object articulation systems 140 can include commercially available high-end 3D computer graphics and 3D modeling software packages 3D STUDIO MAX and AUTODESK MAYA produced by Autodesk, Inc. of San Rafael, Calif.

In various embodiments, the one or more articulation systems 140 can be configured to enable the specification of rigging for an object, such as for internal skeletal structures or eternal features, and to define how input motion deforms the object. One technique is called "skeletal animation," in which a character can be represented in at least two parts: a surface representation used to draw the character (called the skin) and a hierarchical set of bones used for animation (called the skeleton).

The one or more object articulation systems 140 may further generate articulation data (e.g., data associated with controls or animations variables) for use by other elements of system 100 or that can be stored in object library 120. The one or more object articulation systems 140 may be configured to allow a user to associate additional information, metadata, color, lighting, rigging, controls, or the like, with all or a portion of the generated articulation data.

The one or more object animation systems 150 can include hardware and/or software elements configured for animating one or more computer-generated objects. Animation can include the specification of motion and position of an object over time. The one or more object animation systems 150 may be invoked by or used directly by a user of the one or more design computers 110 and/or automatically invoked by or used by one or more processes associated with the one or more design computers 110. Some examples of software programs embodied as the one or more object animation systems 150 can include commercially available high-end 3D computer graphics and 3D modeling software packages 3D STUDIO MAX and AUTODESK MAYA produced by Autodesk, Inc. of San Rafael, Calif.

In various embodiments, the one or more animation systems 150 may be configured to enable users to manipulate controls or animation variables or utilized character rigging to specify one or more key frames of animation sequence. The one or more animation systems 150 generate intermediary frames based on the one or more key frames. In some embodiments, the one or more animation systems 150 may be configured to enable users to specify animation cues, paths, or the like according to one or more predefined sequences. The one or more animation systems 150 generate frames of the animation based on the animation cues or paths. In further embodiments, the one or more animation systems 150 may be configured to enable users to define animations using one or more animation languages, morphs, deformations, or the like.

The one or more object animations systems 150 may further generate animation data (e.g., inputs associated with controls or animations variables) for use by other elements of system 100 or that can be stored in object library 120. The one or more object animations systems 150 may be configured to allow a user to associate additional information, metadata, color, lighting, rigging, controls, or the like, with all or a portion of the generated animation data.

The one or more object simulation systems 160 can include hardware and/or software elements configured for simulating one or more computer-generated objects. Simulation can include determining motion and position of an object over time in response to one or more simulated forces or conditions. The one or more object simulation systems 160 may be invoked by or used directly by a user of the one or more design computers 110 and/or automatically invoked by or used by one or more processes associated with the one or more design computers 110. Some examples of software programs embodied as the one or more object simulation systems 160 can include commercially available high-end 3D computer graphics and 3D modeling software packages 3D STUDIO MAX and AUTODESK MAYA produced by Autodesk, Inc. of San Rafael, Calif.

In various embodiments, the one or more object simulation systems 160 may be configured to enables users to create, define, or edit simulation engines, such as a physics engine or physics processing unit (PPU/GPGPU) using one or more physically-based numerical techniques. In general, a physics engine can include a computer program that simulates one or more physics models (e.g., a Newtonian physics model), using variables such as mass, velocity, friction, wind resistance, or the like. The physics engine may simulate and predict effects under different conditions that would approximate what happens to an object according to the physics model. The one or more object simulation systems 160 may be used to simulate the behavior of objects, such as hair, fur, and cloth, in response to a physics model and/or animation of one or more characters and objects within a computer-generated scene.

The one or more object simulation systems 160 may further generate simulation data (e.g., motion and position of an object over time) for use by other elements of system 100 or that can be stored in object library 120. The generated simulation data may be combined with or used in addition to animation data generated by the one or more object animation systems 150. The one or more object simulation systems 160 may be configured to allow a user to associate additional information, metadata, color, lighting, rigging, controls, or the like, with all or a portion of the generated simulation data.

The one or more object rendering systems 170 can include hardware and/or software element configured for "rendering" or generating one or more images of one or more computer-generated objects. "Rendering" can include generating an image from a model based on information such as geometry, viewpoint, texture, lighting, and shading information. The one or more object rendering systems 170 may be invoked by or used directly by a user of the one or more design computers 110 and/or automatically invoked by or used by one or more processes associated with the one or more design computers 110. One example of a software program embodied as the one or more object rendering systems 170 can include PhotoRealistic RenderMan, or PRMan, produced by Pixar Animations Studios of Emeryville, Calif.

In various embodiments, the one or more object rendering systems 170 can be configured to render one or more objects to produce one or more computer-generated images or a set of images over time that provide an animation. The one or more object rendering systems 170 may generate digital images or raster graphics images.

In various embodiments, a rendered image can be understood in terms of a number of visible features. Some examples of visible features that may be considered by the one or more object rendering systems 170 may include shading (e.g., techniques relating to how the color and brightness of a surface varies with lighting), texture-mapping (e.g., techniques relating to applying detail information to surfaces or objects using maps), bump-mapping (e.g., techniques relating to simulating small-scale bumpiness on surfaces), fogging/participating medium (e.g., techniques relating to how light dims when passing through non-clear atmosphere or air) shadows (e.g., techniques relating to effects of obstructing light), soft shadows (e.g., techniques relating to varying darkness caused by partially obscured light sources), reflection (e.g., techniques relating to mirror-like or highly glossy reflection), transparency or opacity (e.g., techniques relating to sharp transmissions of light through solid objects), translucency (e.g., techniques relating to highly scattered transmissions of light through solid objects), refraction (e.g., techniques relating to bending of light associated with transparency), diffraction (e.g., techniques relating to bending, spreading and interference of light passing by an object or aperture that disrupts the ray), indirect illumination (e.g., techniques relating to surfaces illuminated by light reflected off other surfaces, rather than directly from a light source, also known as global illumination), caustics (e.g., a form of indirect illumination with techniques relating to reflections of light off a shiny object, or focusing of light through a transparent object, to produce bright highlights on another object), depth of field (e.g., techniques relating to how objects appear blurry or out of focus when too far in front of or behind the object in focus), motion blur (e.g., techniques relating to how objects appear blurry due to high-speed motion, or the motion of the camera), non-photorealistic rendering (e.g., techniques relating to rendering of scenes in an artistic style, intended to look like a painting or drawing), or the like.

The one or more object rendering systems 170 may further render images (e.g., motion and position of an object over time) for use by other elements of system 100 or that can be stored in object library 120. The one or more object rendering systems 170 may be configured to allow a user to associate additional information or metadata with all or a portion of the rendered image.

Real-Time Tetrahedral Mesh Generation

In various embodiments, system 100 may include one or more hardware elements and/or software elements, components, tools, or processes, embodied as the one or more design computers 110, object library 120, the one or more object modeler systems 130, the one or more object articulation systems 140, the one or more object animation systems 150, the one or more object simulation systems 160, and/or the one or more object rendering systems 170 that provide one or more tools for dynamically generating tetrahedral meshes in real-time on animated characters. The tetrahedral volumes can be generated with features similar to an original mesh surface of an animated character in a rapid and efficient manner. The rapid generation of the tetrahedral volumes allows them to be used for a variety of real-time or near real-time purposes, such as approximating bounding volumes for collision detection. Accordingly, in one aspect, more accurate and higher quality collision detection can be achieved using the original mesh surface in real-time without using a proxy of the original mesh surface or a simulation thereof. In another aspect, the tetrahedral volumes can be used in simulations as a more suitable proxy dynamically generated from the original mesh surface.

Figure 2:
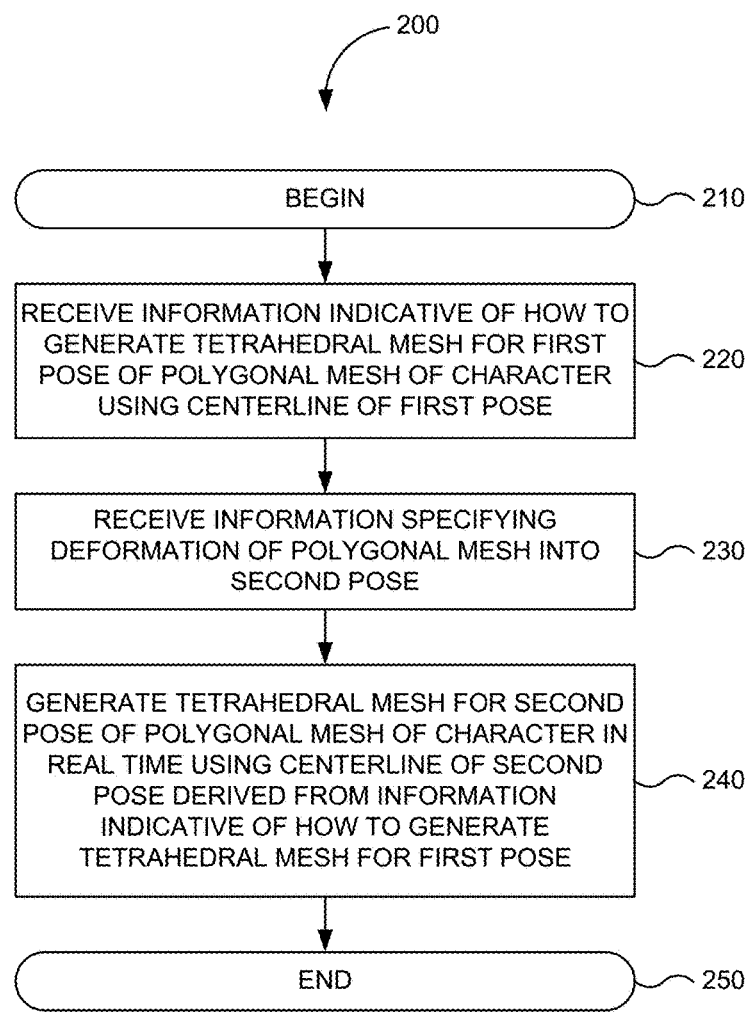
FIG. 2 is a simplified flowchart of a method for dynamically generating tetrahedral meshes using a centerline on animated characters in one embodiment according to the present invention.

FIG. 2 is a simplified flowchart of method 200 for dynamically generating tetrahedral meshes using a centerline on animated characters in one embodiment according to the present invention. Implementations of or processing in method 200 depicted in FIG. 2 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 200 depicted in FIG. 2 begins in step 210.

In step 220, information is received indicative of how to generate a tetrahedral mesh for a first pose of a polygonal mesh of a character using a centerline of the first pose. In various embodiments, system 100 receives information indicative of a reference axis. System 100 breaks up or otherwise partitions a bounding box of the polygonal mesh along the reference axis into a predetermined number of segments. The predetermined number of segments of the bounding box can be used to determine the centerline of the first pose. Once a centerline is established, one or more techniques can be used to generate the tetrahedral mesh for the first pose. In one aspect, each triangle (or polygonal face) is extruded onto a predetermined point of the centerline. These prisms can then be broken up into tets.

In step 230, information is received specifying a deformation of the polygonal mesh into a second pose. For example, a user (such as an animator) may manipulate on or more vertices of the polygonal mesh or interact with one or more animation variables to deform the mesh into the second pose.

In step 240, a tetrahedral mesh is generated for the second pose of the polygonal mesh of the character in real-time using a centerline of the second pose derived from the indicative of how to generate the tetrahedral mesh for the first pose. In one embodiment, the predetermined number of segments of the bounding box used to determine the centerline of the first pose can be matched to the second pose allowing the centerline of the second pose to be established. As discussed above, one or more techniques can be used to generate the tetrahedral mesh for the second pose using the centerline for the second pose. FIG. 2 ends in step 250.

Method 200 discussed above allows for tetrahedral meshes (or volumes) to be generated in a rapid and efficient manner to be utilized in a variety of applications, such as bounding volumes for collision detection, in finite element CAD/fluid simulations, in medical simulation, and the like. In one aspect, method 200 allows tetrahedral meshes (or volumes) to be generated that very closely approximate cylindrical capsules in collision range of response (which proceeds smoothly to the centerline and then flips direction). In this application, the centerline process allows the collider mesh to be deformed in real-time facilitating the animation process and providing immediate feedback to users. In another aspect, method 200 allows tetrahedral meshes (or volumes) to be generated that conform to a posed mesh surface. The tetrahedral meshes (or volumes) can be utilized in simulations and other application that require such criteria to be satisfied.

Centerlines Based on Mesh Membership

In various embodiments, tetrahedral meshes (or volumes) are generated rapidly and efficiently using centerlines. In one embodiment, the centerline used to generate a tetrahedral meshes can be derived or controlled from bounding boxes. In one aspect, a plurality of bounding boxes provides control points that define a spline or curve used as a centerline from which a tetrahedral mesh may be generated. Once a centerline is defined for a portion of a polygonal mesh, polygons can be extruded onto the centerline to define prisms that may be broken up into tets.

Figure 3:
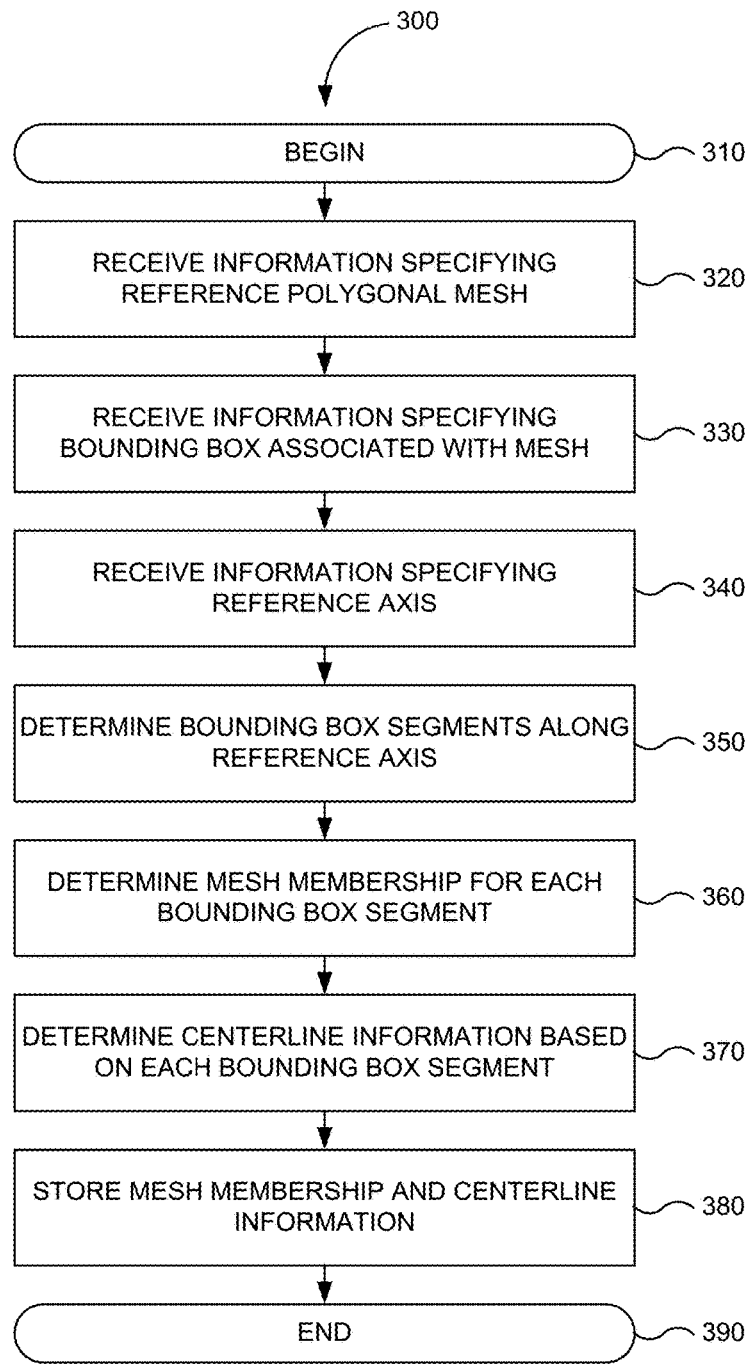
FIG. 3 is flowchart of a method for determining mesh membership information allowing tetrahedral meshes to be dynamically generated using a centerline on animated characters in one embodiment according to the present invention.

FIG. 3 is flowchart of method 300 for determining mesh membership information allowing tetrahedral meshes to be dynamically generated using a centerline on animated characters in one embodiment according to the present invention. Implementations of or processing in method 300 depicted in FIG. 3 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 300 depicted in FIG. 3 begins in step 310.

In step 320, information is received specifying a reference polygonal mesh. For example, a user of system 100 may model a polygonal mesh utilizing one or more modeling tools. The reference mesh may be defined in a predetermined rest state or rest pose.

In step 320, information is received specifying a bounding box associated with the reference mesh. One or more techniques known in that art may be used to define a bounding box across all or a portion of the reference mesh.

In step 330, information is received specifying a reference axis. In one aspect, the reference axis may be aligned with a predetermined direction of a coordinate frame. In another aspect, the reference axis aligns one or more features of the polygonal mesh. In various embodiments, a reference axis may be specified by a user. In another embodiment, the reference axis may be determined dynamically based on aspects or features of the polygonal mesh.

In step 350, one or more bounding box segments are determined along the reference axis. For example, the bounding box may be partitioned into one or more of a predetermined number of equal partitions. In another example, the bounding box may be partitioned into non-uniform partitions. User input or other factors, such as geometry, may determine the number, spacing, and uniformity of the bounding box segments. Alternative, individual bounding boxes may be determined or generated as opposed to partitioning an existing bounding box.

In step 360, mesh membership is determined for each bounding box segment. For example, an association is made between each location on the polygonal mesh and a bounding box (or segment) that encloses or bounds the location. Vertices may be grouped based on to which bounding box or bounding box segment a set of vertices are bound.

In step 370, centerline information is determined based on each bounding box segment. For example, aspects of each bounding box may provide a guide for generating a spline or curve through each center of a plurality of segments. In one embodiment, the center of each bounding box is used as a control point for a curve or spline to be generated therefrom.

In another aspect, a center mass determination may be used to provide the control points for the spline or curve representing the centerline.

In step 380, the mesh membership information and centerline information is stored. Storage of the mesh membership information and the centerline information may occur at bind-time, for example. Thereafter, the mesh membership information and the centerline information may be used to dynamically generate tetrahedral meshes on an animated character. In one aspect, tetrahedral meshes may be generated using the disclosed techniques to facilitate processing, such as collision detection and response in real-time without the need for simulation or during a simulation process. FIG. 3 ends in step 390.

Figure 4A:
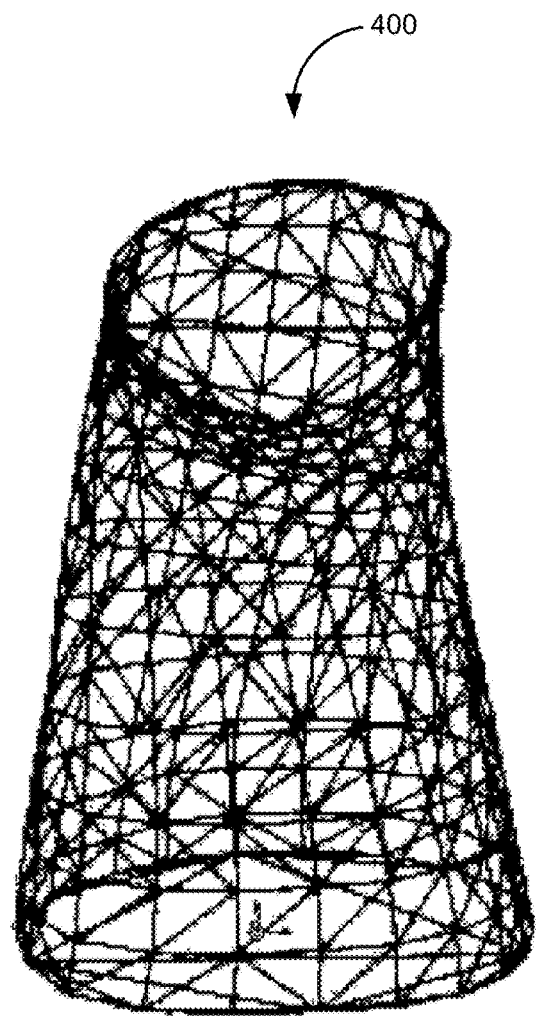
FIGS. 4A-4C are illustrations depicting how mesh membership information is determined in one embodiment.
Figure 4B:
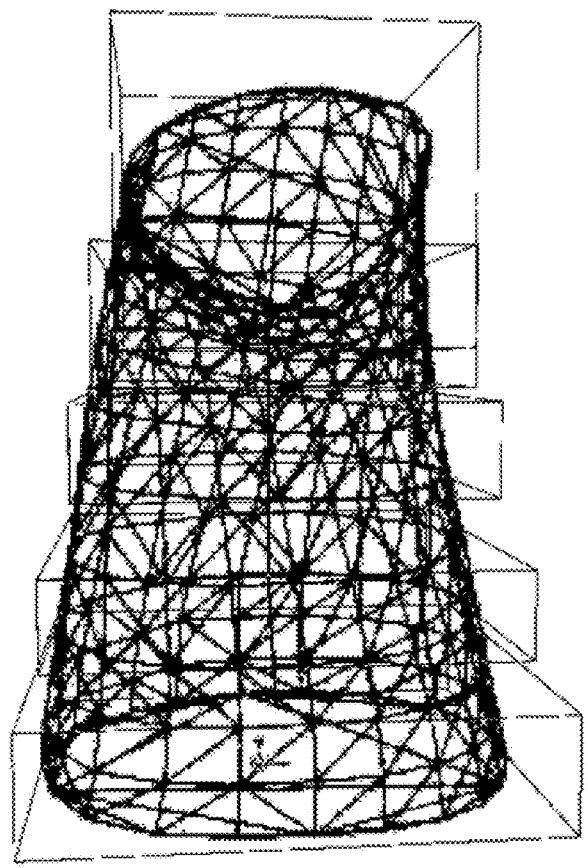
Figure 4C:
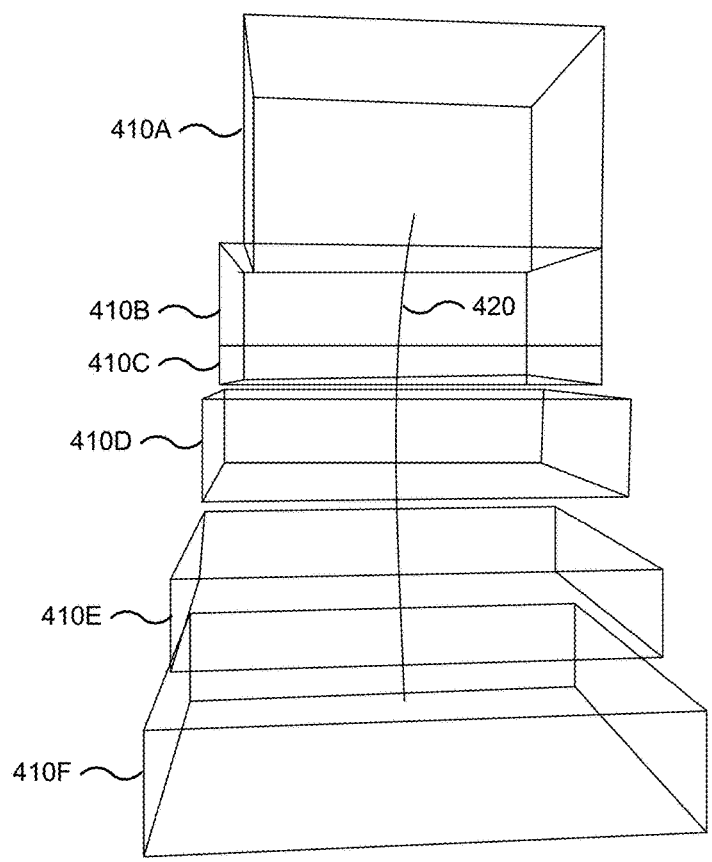

FIGS. 4A-4C are illustrations depicting how mesh membership information is determined in one embodiment. In this example, FIG. 4A illustrates polygonal mesh 400. Mesh 400 may include any number of vertices, edges, and faces that form the geometry of one or more surfaces or volumes. Mesh 400 may represent an arm, leg, or other part of an animated character. Mesh 400 may be manipulated either directly or using controls or animation variables into a variety of poses.

FIG. 4B illustrates a plurality of bounding boxes or a series of bounding box segments associated with mesh 400. In general, the bounding box segments are aligned along the length of mesh 400. FIG. 4C illustrates the plurality of bounding boxes 410A-410F associated with mesh 400 together with centerline 420. As discussed above, aspects of bounding boxes 410A-410F can be used to generate centerline 420.

Real-Time Tetrahedral Mesh Generation Using Centerlines

Figure 5:
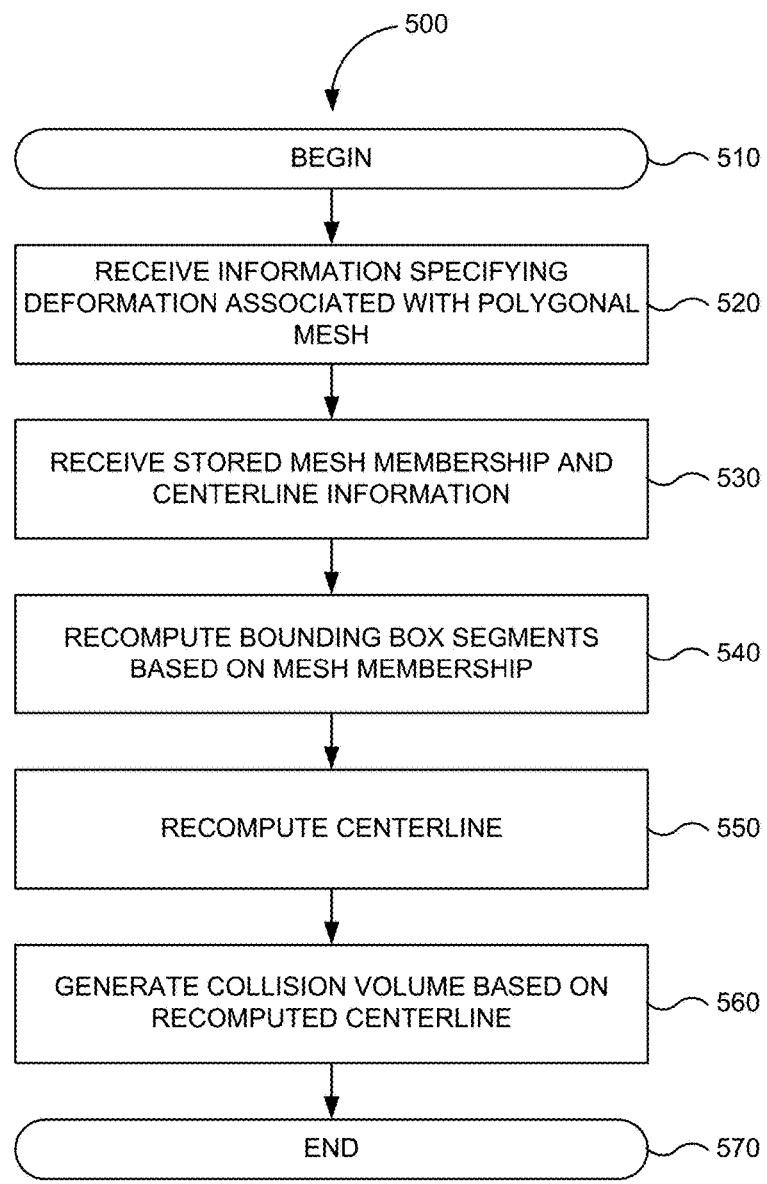
FIG. 5 is a flowchart of a method for generating a collision volume using a centerline generated according to the mesh membership information of FIG. 3.

In some embodiments, centerlines can be derived or controlled from information cached or stored about the mesh membership of FIG. 3 allowing tetrahedral meshes to be generated in real-time. FIG. 5 is a flowchart of method 5000 for generating a collision volume using a centerline generated according to the mesh membership information of FIG. 3. Implementations of or processing in method 500 depicted in FIG. 5 may be performed by software (e.g., instructions or code modules) when executed by a central processing unit (CPU or processor) of a logic machine, such as a computer system or information processing device, by hardware components of an electronic device or application-specific integrated circuits, or by combinations of software and hardware elements. Method 500 depicted in FIG. 5 begins in step 510.

In step 520, information is received specifying a deformation associated with a polygonal mesh. For example, an animator may directly or indirectly manipulate the vertices of mesh 400 to generate a number of poses in an animation sequence. In step 530, the stored mesh membership and the centerline information is received. The information may be retrieved from a cache or from a database.

In step 540, the bounding box segments are recomputed based on the mesh membership. For example, the updated geometry of the deformation may move one or more of the vertices of mesh 400. The bounding boxes are recomputed, for example, such that all vertices of the mesh in the reference pose are again in the same bounding box notwithstanding their new location according to the deformation.

In step 550, a centerline for the deformation is computed. Similar to above, the recomputed bounding box segments guide how to generate the centerline. In step 560, a collision volume is generated based on the recomputed centerline.

In various embodiments, each vertex of mesh 400 is extruded onto the closest point on the centerline (or centerline segment of the vertex). In one aspect, the extrusion may be backtracked along a projection line such that an inset triangle is formed. The inset/outset prism can then be broken up into tets to generate a tetrahedral mesh for the collision volume. FIG. 5 ends in step 570.

FIGS. 6A-6D are illustrations depicting how a collusion volume is generated in real-time using a centerline in one embodiment. In this example, FIG. 6 illustrates polygonal mesh 600. Mesh 600 may be similar or identical structurally to mesh 400 (or be mesh 400) but in a different pose.

Figure 6A:
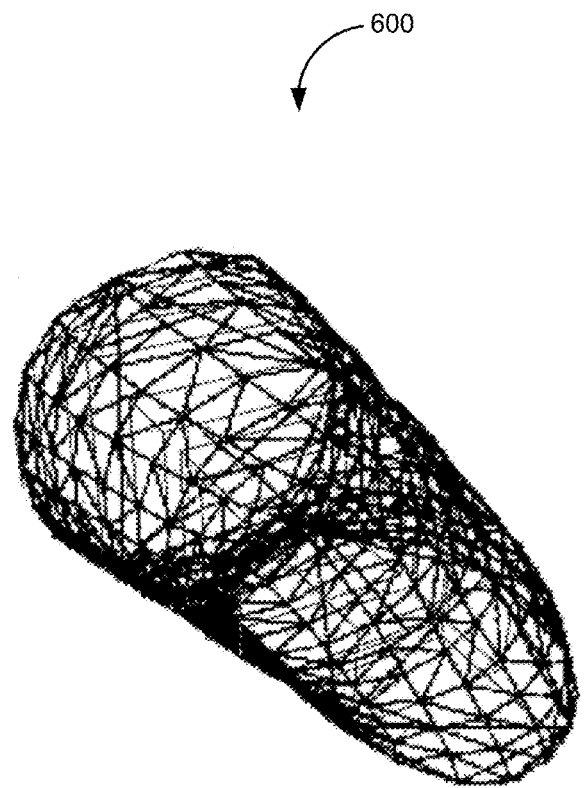
FIGS. 6A-6D are illustrations depicting how a collusion volume is generated in real-time using a centerline in one embodiment.
Figure 6B:
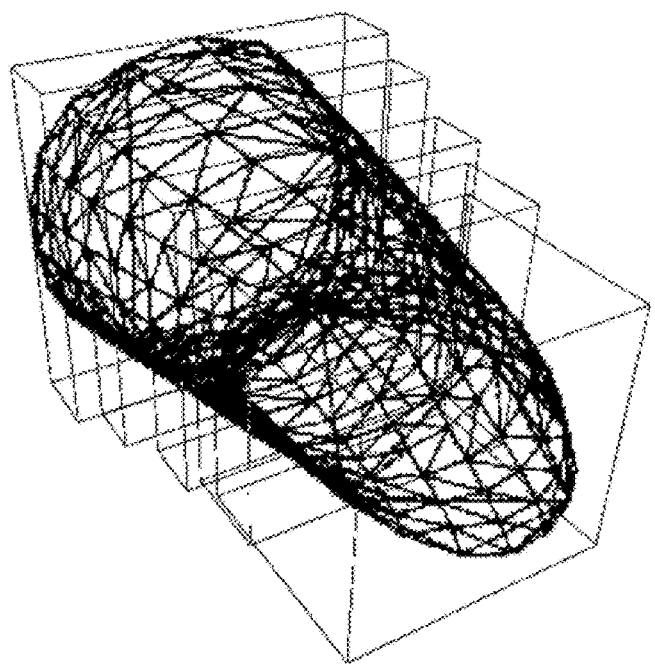
Figure 6C:
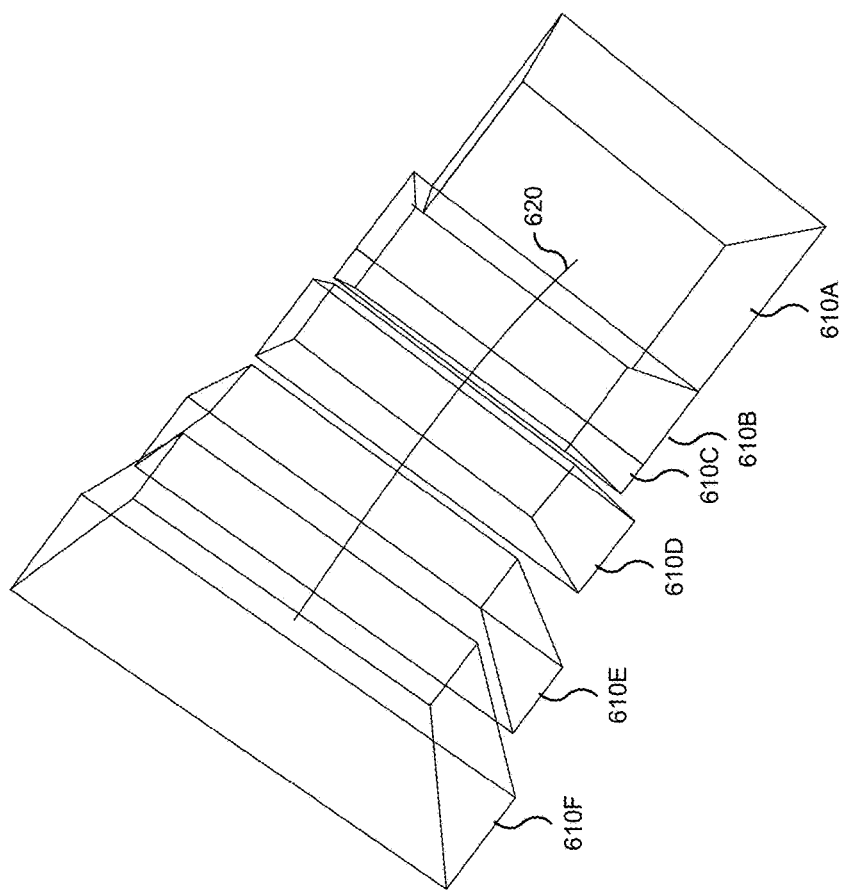

FIG. 6B illustrates a plurality of bounding boxes or a series of bounding box segments associated with mesh 600 in the new pose. In general, the bounding box segments are aligned along the length of mesh 600. FIG. 6C illustrates the plurality of recomputed bounding boxes 610A-610F associated with mesh 600 together with centerline 620. As discussed above, aspects of bounding boxes 610A-610F are used to generate centerline 620.

Figure 6D:
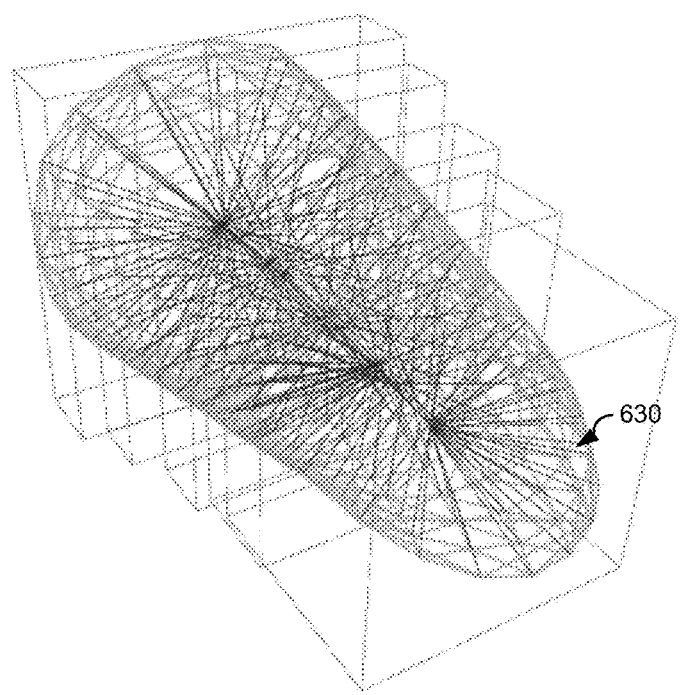

FIG. 6D illustrates tetrahedral mesh 630 generated using centerline 620. In one aspect, faces of mesh 600 are extruded onto the closest point on centerline 620. In one aspect, the extrusion may be backtracked along a projection line such that an inset triangle is formed. The inset/outset prism can then be broken up into tets to generate tetrahedral mesh 630.

Conclusion

Figure 7:
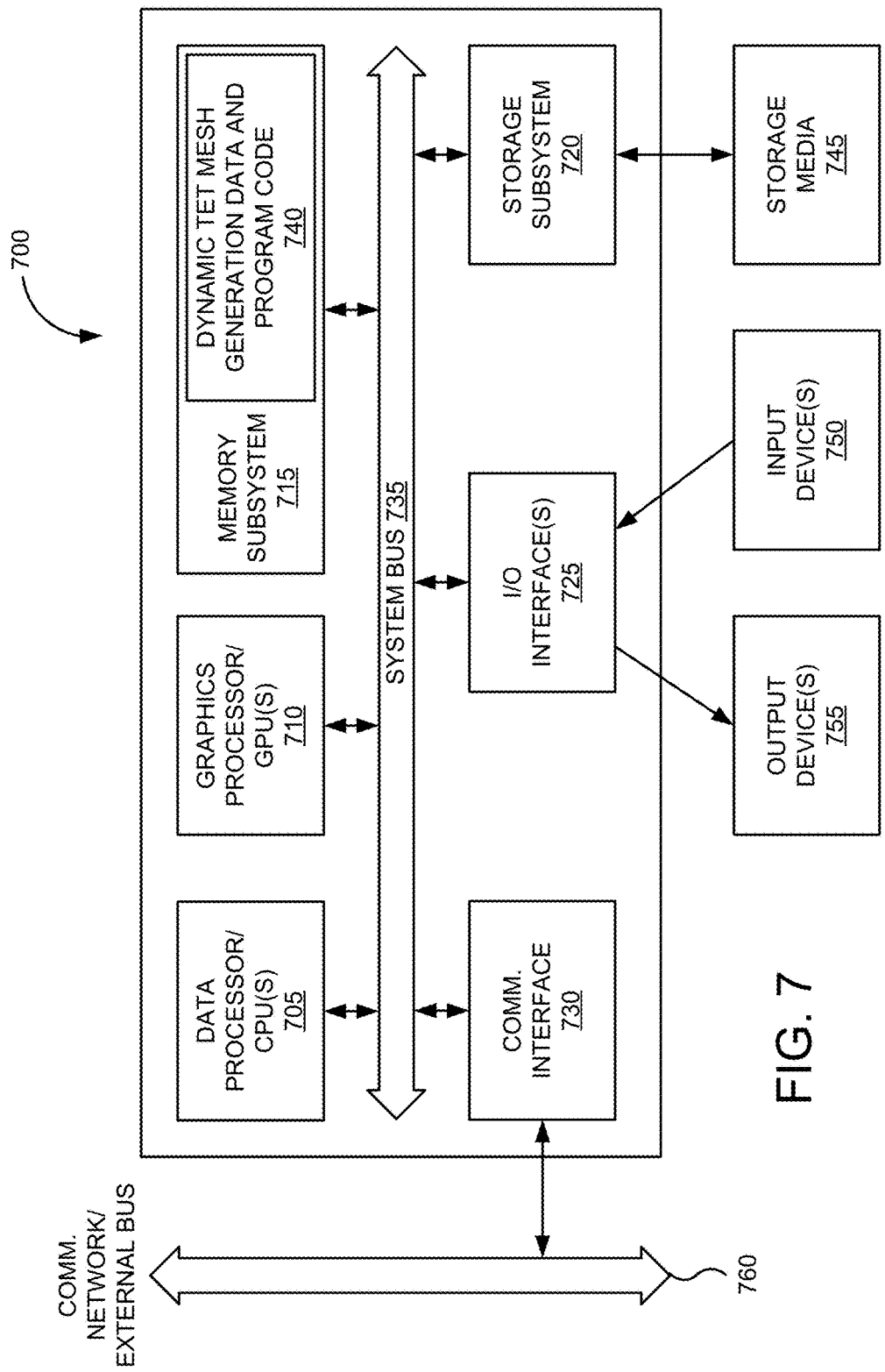
FIG. 7 is a block diagram of a computer system or information processing device that may incorporate an embodiment, be incorporated into an embodiment, or be used to practice any of the innovations, embodiments, and/or examples found within this disclosure.

FIG. 7 is a block diagram of a computer system or information processing device that may incorporate an embodiment, be incorporated into an embodiment, or be used to practice any of the innovations, embodiments, and/or examples found within this disclosure.

FIG. 7 is a block diagram of computer system 700 that may incorporate an embodiment, be incorporated into an embodiment, or be used to practice any of the innovations, embodiments, and/or examples found within this disclosure. FIG. 7 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 700 can include hardware and/or software elements configured for performing logic operations and calculations, input/output operations, machine communications, or the like. Computer system 700 may include familiar computer components, such as one or more data processors or central processing units (CPUs) 705, one or more graphics processors or graphical processing units (GPUs) 710, memory subsystem 715, storage subsystem 720, one or more input/output (I/O) interfaces 725, communications interface 730, or the like. Computer system 700 can include system bus 735 interconnecting the above components and providing functionality, such connectivity and inter-device communication. Computer system 700 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 705 can include hardware and/or software elements configured for executing logic or program code or for providing application-specific functionality. Some examples of CPU(s) 705 can include one or more microprocessors (e.g., single core and multi-core) or micro-controllers. CPUs 705 may include 4-bit, 8-bit, 12-bit, 16-bit, 32-bit, 64-bit, or the like architectures with similar or divergent internal and external instruction and data designs. CPUs 705 may further include a single core or multiple cores. Commercially available processors may include those provided by Intel of Santa Clara, Calif. (e.g., x86, x86_64, PENTIUM, CELERON, CORE, CORE 2, CORE ix, ITANIUM, XEON, etc.), by Advanced Micro Devices of Sunnyvale, Calif. (e.g., x86, AMD_64, ATHLON, DURON, TURION, ATHLON XP/64, OPTERON, PHENOM, etc). Commercially available processors may further include those conforming to the Advanced RISC Machine (ARM) architecture (e.g., ARMv7-9), POWER and POWERPC architecture, CELL architecture, and or the like. CPU(s) 705 may also include one or more field-gate programmable arrays (FPGAs), application-specific integrated circuits (ASICs), or other microcontrollers. The one or more data processors or central processing units (CPUs) 705 may include any number of registers, logic units, arithmetic units, caches, memory interfaces, or the like. The one or more data processors or central processing units (CPUs) 705 may further be integrated, irremovably or moveably, into one or more motherboards or daughter boards.

The one or more graphics processor or graphical processing units (GPUs) 710 can include hardware and/or software elements configured for executing logic or program code associated with graphics or for providing graphics-specific functionality. GPUs 710 may include any conventional graphics processing unit, such as those provided by conventional video cards. Some examples of GPUs are commercially available from NVIDIA, ATI, and other vendors. In various embodiments, GPUs 710 may include one or more vector or parallel processing units. These GPUs may be user programmable, and include hardware elements for encoding/decoding specific types of data (e.g., video data) or for accelerating 2D or 3D drawing operations, texturing operations, shading operations, or the like. The one or more graphics processors or graphical processing units (GPUs) 710 may include any number of registers, logic units, arithmetic units, caches, memory interfaces, or the like. The one or more data processors or central processing units (CPUs) 705 may further be integrated, irremovably or moveably, into one or more motherboards or daughter boards that include dedicated video memories, frame buffers, or the like.

Memory subsystem 715 can include hardware and/or software elements configured for storing information. Memory subsystem 715 may store information using machine-readable articles, information storage devices, or computer-readable storage media. Some examples of these articles used by memory subsystem 770 can include random access memories (RAM), read-only-memories (ROMS), volatile memories, non-volatile memories, and other semiconductor memories. In various embodiments, memory subsystem 715 can include dynamic tetrahedral mesh generation data and program code 740.

Storage subsystem 720 can include hardware and/or software elements configured for storing information. Storage subsystem 720 may store information using machine-readable articles, information storage devices, or computer-readable storage media. Storage subsystem 720 may store information using storage media 745. Some examples of storage media 745 used by storage subsystem 720 can include floppy disks, hard disks, optical storage media such as CD-ROMs, DVDs and bar codes, removable storage devices, networked storage devices, or the like. In some embodiments, all or part of dynamic tetrahedral mesh generation data and program code 740 may be stored using storage subsystem 720.

In various embodiments, computer system 700 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 700 may also include one or more applications configured to execute, perform, or otherwise implement techniques disclosed herein. These applications may be embodied as dynamic tetrahedral mesh generation data and program code 740. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 715 and/or storage subsystem 720.

The one or more input/output (I/O) interfaces 725 can include hardware and/or software elements configured for performing I/O operations. One or more input devices 750 and/or one or more output devices 755 may be communicatively coupled to the one or more I/O interfaces 725.

The one or more input devices 750 can include hardware and/or software elements configured for receiving information from one or more sources for computer system 700. Some examples of the one or more input devices 750 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 750 may allow a user of computer system 700 to interact with one or more non-graphical or graphical user interfaces to enter a comment, select objects, icons, text, user interface widgets, or other user interface elements that appear on a monitor/display device via a command, a click of a button, or the like.

The one or more output devices 755 can include hardware and/or software elements configured for outputting information to one or more destinations for computer system 700. Some examples of the one or more output devices 755 can include a printer, a fax, a feedback device for a mouse or joystick, external storage systems, a monitor or other display device, a communications interface appropriately configured as a transceiver, or the like. The one or more output devices 755 may allow a user of computer system 700 to view objects, icons, text, user interface widgets, or other user interface elements.

A display device or monitor may be used with computer system 700 and can include hardware and/or software elements configured for displaying information. Some examples include familiar display devices, such as a television monitor, a cathode ray tube (CRT), a liquid crystal display (LCD), or the like.

Communications interface 730 can include hardware and/or software elements configured for performing communications operations, including sending and receiving data. Some examples of communications interface 730 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 730 may be coupled to communications network/external bus 780, such as a computer network, to a FireWire bus, a USB hub, or the like. In other embodiments, communications interface 730 may be physically integrated as hardware on a motherboard or daughter board of computer system 700, may be implemented as a software program, or the like, or may be implemented as a combination thereof.

In various embodiments, computer system 700 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 700.

As suggested, FIG. 7 is merely representative of a general-purpose computer system appropriately configured or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as implemented upon a chip or an auxiliary processing board.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for dynamically generating tetrahedral meshes, the method comprising:
    receiving, at one or more computer systems, information specifying a polygonal mesh;
    determining, at the one or more computing systems, a plurality of bounding boxes for the polygonal mesh;
    receiving, at the one or more computer systems, membership information indicating which locations on the polygonal mesh are enclosed by corresponding bounding boxes;
    receiving, at the one or more computer systems, membership information indicating which locations on the polygonal mesh are enclosed by corresponding bounding boxes;
    receiving, at the one or more computer systems, information specifying a deformation of the polygonal mesh into a second pose;
    recomputing, at the one or more computing systems, the plurality of bounding boxes for the polygonal mesh based on membership information and the deformation of the polygonal mesh;
    generating, with one or more processors associated with the one or more computer systems, a centerline associated with the second pose of the polygonal mesh, the centerline associated with the second pose being through a center of each of the recomputed plurality of bounding boxes; and
    generating, with the one or more processors associated with the one or more computer systems, a tetrahedral mesh that bounds the second pose of the polygonal mesh using the centerline associated with the second pose.

2. The method of claim 1 wherein recomputing the plurality of bounding boxes for the polygonal mesh based on membership information and the deformation of the polygonal mesh comprises:
    determining one or more locations on the polygonal mesh that are affected due to the deformation of the polygonal mesh;
    identifying at least one bounding box that encloses the determined locations based on the membership information; and
    recomputing the identified at least one bounding box based on the deformation of the polygonal mesh.

3. The method of claim 1 wherein generating the tetrahedral mesh comprises:
    determining a correspondence between a first polygon associated with the polygonal mesh and at least one location associated with the centerline associated with the second pose; and generating one or more tetrahedron of the tetrahedral mesh based on extending the at least one polygon associated with the polygonal mesh between the at least one location associated with the centerline associated with the second pose.

4. The method of claim 1 wherein the generation of the tetrahedral occurs in real-time relative to the deformation of the polygonal mesh.

5. The method of claim 1, wherein the generation of the tetrahedral comprises:
generating, with the one or more processors associated with the one or more computer systems, the tetrahedral mesh using the centerline associated with the second pose of the polygonal mesh based on extending the polygonal mesh to the centerline associated with the second pose.

6. The method of claim 1 further comprising:
receiving, at the one or more computer systems, information specifying a reference axis; and, wherein
the one or more bounding boxes are determined along the references axis, each bounding box bounding at least a portion of a first pose of the polygonal mesh.

7. The method of claim 1 further comprising generating, with the one or more processors associated with the one or more computer systems, information resolving any collisions based on the tetrahedral mesh.

8. The method of claim 1 further comprising generating, with the one or more processors associated with the one or more computer systems, animation information based on the tetrahedral mesh and the information specifying the deformation of the polygonal mesh into the second pose.

9. A non-transitory computer-readable medium storing computer-executable code for dynamically generating tetrahedral meshes on animated characters, the non-transitory computer-readable medium comprising:
code for information specifying a polygonal mesh;
code for determining one or more bounding boxes for the polygonal mesh;
code for information specifying a deformation of the polygonal mesh into a second pose;
code for receiving membership information indicating locations on the polygonal mesh are enclosed by corresponding bounding boxes;
code for recomputing the one or more bounding boxes for the polygonal mesh based on membership information and the deformation of the polygonal mesh;
code for generating, with one or more processors associated with the one or more computer systems, a centerline associated with the second pose of the polygonal mesh, the centerline associated with the second pose being through a center of each of the recomputed one or more bounding boxes; and
code for generating a tetrahedral mesh that bounds the second pose of the polygonal mesh using the centerline associated with the second pose.

10. The non-transitory computer-readable medium of claim 9 wherein the code for recomputing the one or more bounding boxes for the polygonal mesh based on membership information and the deformation of the polygonal mesh comprises:
code for determining one or more locations on the polygonal mesh are affected due to the deformation of the polygonal mesh;
code for identifying at least one bounding box that enclose the determined locations based on the membership information; and
code for recomputing the identified at least one bounding box based on the deformation of the polygonal mesh.

11. The non-transitory computer-readable medium of claim 9 wherein the code for generating the tetrahedral mesh comprises:
code for determining a correspondence between a first polygon associated with the polygonal mesh and at least one location associated with the centerline associated with the second pose; and
code for generating one or more tetrahedron of the tetrahedral mesh based on extending the at least one polygon associated with the polygonal mesh between the at least one location associated with the centerline associated with the second pose.

12. The non-transitory computer-readable medium of claim 9 wherein the code for generating the tetrahedral mesh comprises code for generating the tetrahedral mesh in real-time relative to the deformation of the polygonal mesh of the character.

13. The non-transitory computer-readable medium of claim 9, wherein the generation of the tetrahedral mesh comprises:
code for generating the tetrahedral mesh using the centerline associated with the second pose of the polygonal mesh based on extending the polygonal mesh to the centerline associated with the second pose.

14. The non-transitory computer-readable medium of claim 9 further comprising:
code for receiving information specifying a reference axis; and, wherein
the one or more bounding boxes are determined along the references axis, each bounding box segment bounding at least a portion of the first pose of the polygonal mesh.

15. The non-transitory computer-readable medium of claim 9 further comprising code for generating information resolving any collisions based on the tetrahedral mesh.

16. The non-transitory computer-readable medium of claim 9 further comprising code for generating animation information based on the tetrahedral mesh and the information specifying the deformation of the polygonal mesh of the character into the second pose.

17. A method for resolving real-time collisions of animated characters, the method comprising:
receiving, at one or more computer systems, membership information specifying associations between one or more locations on a first pose of a character and a plurality of bounding boxes associated with the character;
receiving, at the one or more computer systems, information specifying a second pose of the character;
determining, at the one or more computer systems, deformation information based on the first and second poses of the character;
recomputing, at the one or more computing systems, the plurality of bounding boxes associated with the character based on membership information and the deformation information;
determining, with one or more processors associated with the one or more computer systems, a centerline for the second pose of the character based on the recomputed bounding boxes, the centerline for the second pose being through a center of each of the recomputed bounding boxes; and
generating, with the one or more processors associated with the one or more computer systems, information resolving any collisions based on a bounding volume dynamically created for the second pose of the character using the centerline for the second pose.

18. The method of claim 17 further comprising:
receiving, at the one or more computer systems, information specifying a reference axis; and, wherein
the plurality of bounding boxes are determined along the references axis, each bounding box bounding at least a portion of the first pose of the character.

19. The method of claim 17 further comprising generating the bounding volume as a tetrahedral mesh.

20. The method of claim 17 further comprising generating animation information based on repeatedly resolving any collisions based on a bounding volume dynamically created for a polygonal mesh forming a pose using a centerline for pose.

21. The method of claim 1, further comprising:
generating, at the one or more computer systems, a centerline associated with a first pose of the polygonal mesh based on the bounding boxes, the centerline associated with the first pose being through a center of each of the bounding boxes; and
generating, with the one or more processors associated with the one or more computer systems, a tetrahedral mesh that bounds the first pose of the polygonal mesh; and, wherein
the generation of the tetrahedral that bounds the second pose of the polygonal mesh is based on the tetrahedral mesh that bounds the first pose of the polygonal mesh.

* * * * *